United States Patent
Molaire

(10) Patent No.: US 7,937,023 B2
(45) Date of Patent: May 3, 2011

(54) METHOD AND A COMPOSITION FOR PRODUCING AN UNDERCOAT LAYER USING DIALKYL MALONATE BLOCKED ISOCYANATES (FOR ELECTROPHOTOGRAPHIC APPLICATIONS)

(75) Inventor: Michel F. Molaire, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 915 days.

(21) Appl. No.: 10/888,484

(22) Filed: Jul. 9, 2004

(65) Prior Publication Data

US 2006/0009576 A1     Jan. 12, 2006

(51) Int. Cl.
G03G 15/00 (2006.01)
C04B 26/06 (2006.01)

(52) U.S. Cl. ........ 399/159; 524/437; 524/435; 524/434; 524/431; 528/49; 528/45; 428/323

(58) Field of Classification Search .................. 428/323; 399/159; 528/45, 49; 524/431, 434, 435, 524/437

See application file for complete search history.

(56) References Cited

U.S. PATENT DOCUMENTS

| | | | | |
|---|---|---|---|---|
| 4,007,215 A | | 2/1977 | Hartmann et al. | 260/468 J |
| 4,435,450 A | * | 3/1984 | Coleman | 427/385.5 |
| 4,474,934 A | | 10/1984 | Tanaka et al. | 528/45 |
| 4,518,522 A | | 5/1985 | Markusch et al. | 252/188.31 |
| 4,533,684 A | | 8/1985 | Kordomenos et al. | 523/436 |
| 4,596,744 A | | 6/1986 | Anderson et al. | 428/418 |
| 4,785,068 A | | 11/1988 | Tominaga et al. | 528/45 |
| 4,806,585 A | | 2/1989 | Nakayama et al. | 524/376 |
| 4,824,925 A | | 4/1989 | Kamarchik, Jr. et al. | 528/45 |
| 5,017,965 A | * | 5/1991 | Hashimoto et al. | 399/176 |
| 5,202,406 A | | 4/1993 | Dearth et al. | 528/45 |
| 5,204,203 A | | 4/1993 | Ito et al. | 430/96 |
| 5,238,764 A | | 8/1993 | Molaire et al. | 430/58 |
| 5,653,918 A | * | 8/1997 | Towlson | 252/514 |
| 6,962,746 B2 | * | 11/2005 | Taniguchi et al. | 428/323 |
| 2003/0032719 A1 | * | 2/2003 | Sapper | 524/589 |
| 2003/0236360 A1 | | 12/2003 | Gurtler et al. | 525/453 |
| 2004/0030086 A1 | | 2/2004 | Schelhaas et al. | 528/45 |

FOREIGN PATENT DOCUMENTS

JP      2003043721    *   2/2003

OTHER PUBLICATIONS

Saunders et al; Polyurethanes; 1962; p. 120.*
Jones, Richard; Combinations of Malonate and Pyrazole-Blocked Isocyanates to Improve Performance; Apr. 2, 2003.*
Dow Chemicals Data Sheet for "UCAR VAGF".*

* cited by examiner

*Primary Examiner* — Milton I Cano
*Assistant Examiner* — Michael Leonard
(74) *Attorney, Agent, or Firm* — Carl F. Ruoff

(57) ABSTRACT

A method and a composition for the production of surface smoothing polyurethane layers for application to a substrate prior to subsequent application of a charge generation layer for electrophotographic applications by preparing a coating solution containing a dialkyl malonate capped isocyanate or polyisocyanate, a polyol and at least one finely-divided metal oxide, coating the substrate with the coating solution and heating the coating solution to a temperature up to about 140° C.

24 Claims, No Drawings

US 7,937,023 B2

METHOD AND A COMPOSITION FOR PRODUCING AN UNDERCOAT LAYER USING DIALKYL MALONATE BLOCKED ISOCYANATES (FOR ELECTROPHOTOGRAPHIC APPLICATIONS)

FIELD OF THE INVENTION

The present invention relates to a method and a composition for the production of surface smoothing layers for application to a substrate prior to subsequent application of a charge generation layer or other layer for electrophotographic applications.

BACKGROUND OF THE INVENTION

Undercoat layers are necessary in electrophotographic applications to smooth any surface imperfections of the substrate, to prevent charge injection disruption of the thin and delicate charge generating layer and the like. Failure to deposit this layer results in image defects, such as black or white spots, depending upon the development process. Depending upon the substrate, dark decay may also be a problem. To be effective, the solvent used to coat the subsequent layers must not attack the undercoat layers. The best way to achieve this is to cross-link the undercoat layer once it has been deposited on the substrate.

For dip coating processes, coating solution stability and uniformity is a must. The cross-linking chemistry cannot be allowed to occur in the coating tank. Urethane chemistry has been used extensively in the automotive industry in cross-linked systems. In some applications, the isocyanate groups and the polyol second components are kept isolated and mixed immediately before coating. The isocyanate groups are very active. Once the two components are mixed, the pot life is very short. Blocking technology was developed to overcome these limitations. Blocked isocyanates have been used to generate cross-linked urethanes upon deblocking of the isocyanate moiety by heat. Thus, at room temperature the mixture is extremely stable. The blocked isocyanates use a variety of blocking agents to achieve a range of activation temperatures and physical properties. Methyl ethyl ketoxime unblocks at a temperature of about 150° C. Caprolactam unblocks at 170° C. Alkylated phenol unblocks at temperatures above 170° C. and malonic acid esters unblock at 90° C.

The deblocking temperatures are minimum deblocking temperatures. In actual practice, the reaction temperature depends on the structure of the isocyanate and the presence of catalysts.

For electrophotographic applications, dip coating is preferred for the manufacture of high quality, photosensitive drums. Other coating techniques may be used such as hopper coating, spray coating, knife coating and the like. All such coating techniques require that the coating solution be stable and uniform. To optimize throughput and reduce cost, it is highly desirable to minimize processing time and energy. It is desirable to choose chemistries, including cross-linking chemistries, which are compatible with efficient processing. Desirably, the curing time is very rapid and lower temperatures for curing are preferred.

Further, electrophotographic systems are very sensitive to impurities. The wrong materials, even at parts per million (ppm) levels, can be very problematic. Therefore, it is essential to use the purest materials available as well as avoiding generating harmful byproducts during the electrophotographic element processing, especially during the curing step. This consideration must be taken into account in choosing the cross-linking chemistry to be used.

In U.S. Pat. No. 5,202,406, issued to Randall S. Dearth, et al. on Apr. 13, 1993, a ketoxime blocked poly isocyanate and cyclohexanedicarboxylic acid-based polyester polyol sprayable coating composition is disclosed. The disclosed composition is useful as an automotive chip resistant primer surface polyurethane coating. Oxime blocked poly isocyanates have been disclosed in U.S. Pat. Nos. 4,474,934, issued to Michio Tanaka, et al. on Oct. 2, 1984; 4,533,684, issued to Panagiotis I. Kordomenos on Aug. 6, 1985; 4,596,744, issued to Terry L. Anderson, et al. on Jun. 24, 1986; 4,785,068, issued to Akira Tominaga, et al. on Nov. 15, 1988; 4,806,585, issued to Takeo Nakayama, et al. on Feb. 21, 1989; and 4,824,925, issued to Peter Kamarchik, Jr., et al. on Apr. 25, 1989. The use of Oxime blocked isocyanates for electrophotographic applications is not preferred for two reasons. One the deblocking temperature is very high, 150° C. Two, the Oxime byproduct has the potential to interfere with electrophotographic performance. U.S. Publication No. 2004/0030086 A1, by Michael Schelhaas, et al. published on Feb. 12, 2004 also reported that certain Oxime blocking agents such as butanone Oxime are toxicologically objectionable.

Similarly caprolactam and alkylated phenol blocked isocyanates are not preferred for electrophotographic applications, because of their high deblocking temperatures.

U.S. Publication No. 2003/0236360 A1, by Gurtler et al., published Dec. 25, 2003, disclosed lower temperature blocked isocyanates incorporating secondary amines such as tert-butyl-benzylamine. These blocked isocyanates deblock at about 120° C. However for electrophotographic applications, it is expected that the secondary amine byproduct, even at ppm level can act as a trap.

U.S. Pat. No. 5,204,203, issued to Yoshimasa Ito, et al. issued Apr. 20, 1993, describes the use of Oxime or caprolactam based blocked isocyanates in a single-layer photoconductor. Curing was carried out for four hours at 150 to 160° C.

Baxenden Chemicals, Limited, Baxenden, England, developed the use of 3,5-Dimethylpyrazole (DMP). Several advantages of DMP blocked isocyanates are cited, including lower unblock temperature (110-120° C.) and increased cure response. These attributes would make DMP blocked isocyanates ideal material for electrophotographic applications. However another cited advantage of DMP agent is its low volatility, which results in reduced volatile organic compounds (VOC) emissions. The DMP tends to stay in the coating. The chemical structure of DMP is such that interference with electrophotographic performance is most probable The foregoing patents and publication are hereby incorporated by reference in their entirety.

While it is clear that a variety of blocking materials have been used with isocyanates, it is also clear that the isocyanate-blocked materials present certain problems with respect to production of electrophotographic elements. These problems relate to high unblocking temperature and the generation of undesirable materials that may remain in the polymeric layer. Accordingly, a continued effort has been directed to the development of methods for producing smooth layers of polyurethane by use of low unblocking temperatures and which contain substantially no residual materials as a result of the unblocking process.

SUMMARY OF THE INVENTION

The present invention comprises a method for coating a substrate with a conductive surface smoothing polyurethane layer; the method including: producing a coating solution comprising a dialkyl malonate capped isocyanate or polyisocyanate, a polyol and at least one finely-divided metal oxide; coating the substrate with the coating solution to produce a coated substrate; and heating the coated substrate at a temperature up to about 140° C.

The invention further comprises a coating composition for depositing a conductive surface smoothing coating on an electrophotographic process element, the composition comprising a dialkyl malonate capped isocyanate or polyisocyanate, a polyol and at least one finely divided metal oxide.

DESCRIPTION OF PREFERRED EMBODIMENTS

As discussed above, the use of polyisocyanates or isocyanates and polyols to produce polyurethanes is well known to those skilled in the art. The use of the blocked isocyanates or polyisocyanates has been well known as a method for delaying the polymerization reaction of the isocyanate compounds and the polyols in mixture.

Unfortunately many of the blocking agents are problematic for use to produce surface smoothing, conductive coatings for electrophotographic process elements. As stated above, it has now been discovered that the use dialkyl malonate blocked isocyanates with polyols to produce the desired conductive polyurethanes containing at least one finely divided metal oxide for use as conductive coating is effective to produce the polyurethanes and releases as by products only low molecular weight monofunctional alcohols. These alcohols are quite volatile and are readily removed from the coatings by evaporation during the polymerization process, and even if retained to a slight extent in the coating, will continue to be removed by evaporation over time. Further, these alcohols are not considered to be harmful even if slight amounts are left in the coating polymer layer.

While the use of blocked isocyanates has been known to be effective to produce stable solutions, it has been noted that such solutions upon standing over periods do become crystallized to some extent.

U.S. Pat. No. 4,518,522 issued to Peter H. Markusch, et al. on May 21, 1985, shows a stabilizing amount of a compound having a monofunctional activity can be used to stabilize a solution of blocked isocyanates. This patent is hereby incorporated in its entirety by reference. When dialkyl malonate is used as the blocking material it is desirable that the dialkyl malonate blocked isocyanates be kept in the isocyanate form by the presence of an amount of a monofunctional alkyl alcohol in the solution. The presence of the alcohol provides additional stability in the solution and permits storage for substantial periods of times. Desirably, the alkyl alcohol contains from about 1 to about 12 carbon atoms and preferably contains from about 2 to about 6 carbon atoms. The alkyl alcohol is desirably present in the coating solution in an amount from about 10 to about 25 weight percent (wt. %) of the solution.

The malonate blocked isocyanates or polyisocyanates and polyols are desirably mixed in a ratio such that the hydroxyl group (OH) ratio to the NCO groups is from about 1:1 to about 1:5 and preferably from about 1:1 to about 1:3. The ratio can be varied slightly to determine the functionality, molecular weight and reacting properties of the coating solution, but it is desired that the ratio of the OH to the NCO groups be within this ratio range.

It is desirable that the coating solution contain from about 10 to about 60 weight percent solids. Optionally either the isocyanates or the polyols may be diluted with solvents well known for these materials as desired.

As well known to those skilled in the art in the production of light image accepting layers, typically the substrate is coated with a conductive surface smoothing layer as described in the present invention, followed by an electrical barrier layer, if necessary, a charge generation layer and a charge transport layer as shown in U.S. Pat. No. 5,238,764 issued Aug. 24, 1993 to Molaire, et al. This patent is hereby incorporated by reference in its entirety. These layers function as known to those skilled in the art, and in some instances it may not be necessary to have a electrical barrier layer. The functions of these layers will not be discussed in detail except to note that they are dependent upon an effective surface-smoothing layer as discussed herein.

The surface smoothing layer may be applied to drum elements which are adapted to receive an image from a light source with the light image then being converted to an electric charge image which is then developed by depositing a toner over either the image or the area around the image with the resulting toner image then being transferred to a substrate member such as paper or the like, fused and produced as a copy image. Such processes are well known and need not be discussed further. Alternatively a photoconductor belt image generating system may be used. In either case, with the drum or the belt, it is desirable that the surface smoothing layer be deposited on the substrate as discussed herein. The layer may be, and is preferably, deposited by dip coating. It may also be deposited by hopper coating, spray coating, knife coating or any other suitable method for depositing the coating solution uniformly over the substrate. These methods for coating are well known to those skilled in the art and need not be discussed in any further detail.

Desirably the alkyl groups on the dialkyl malonate contain from about 1 to about 12 and preferably from about 2 to about 6 carbon atoms. In most instances, both of the dialkyl groups will be the same alkyl material. It is possible, however, that in some instances it may be desirable to use different alkyl groups to make dialkyl malonate containing different alkyl groups. Such variations are well within the scope of the subject invention.

Further, the coating solution desirably contains at least one finely divided metal oxide, which is typically present in an amount from about 40 to about 90 wt. % of the polymeric solids in the coating. Desirably the weight percent may vary from about 60 to about 80 percent and preferably is about 75 wt. %. The metal oxides may be selected from the group consisting of materials such as metal oxides of titanium, zirconium, indium, antimony, tin, aluminum, zinc, mixtures thereof and the like.

The finely divided metal oxide should be of a particle size less than about 0.1 micron and desirably should be from about 10 to about 50 nanometers in size.

Desirably the thickness of the deposited polyurethane layer is at least about 2 to about 6 microns and is desirably at least about 10 microns.

As indicated above, the unblocking of the polyisocyanates by decomposition of the dialkyl malonates releases only harmless, relatively light, monofunctional alcohols. Unblocking is relatively easily accomplished at low temperatures, i.e., typically below about 140° C. It has also been found that the dialkyl malonate blocked isocyanates or polyisocyanates are stable over long periods of time as typically required for dip coating and other coating and allow efficient use of the blend of dialkyl malonate blocked isocyanates and polyols. It has been found that the thicker undercoat layers need to be somewhat conductive to prevent charge trapping and high discharged voltages (high Toe). Incorporation of the metal oxides into the surface coating imparts the desired conductivity. The metal oxide concentration should be high enough to allow for particle/particle contact for efficient conductivity.

Metal oxides can be injecting or non-injecting. The use of non-injecting metal oxides, such as titanium oxide and antimony oxide, make it possible to use the undercoat layer as a hole barrier layer and a smoothing layer. In the case of injecting metal oxides, such as tin oxides, a separate hole injection barrier (electrical barrier layer) is required. Desirably, the materials used for the over coating layers, at least the electrical barrier layer or the charge generation layer, whichever is applied immediately over the surface coating layer, should be of materials compatible with the surface smoothing layer.

The following examples will illustrate the practice of this invention.

Example 1

Trixene B1 7963 Blocked Isocyanate

In a four-liter wide mouth jar, 186 grams (g) of vinyl polyol (VAGF) from The Dow Chemical Company, Midland, Mich., containing 81% vinyl chloride and 4% vinyl acetate, with a hydroxyl value of 59, and a calculated hydroxyl equivalent weight of 951 were mixed with three hundred grams of methyl ethyl ketone (MEK) solvent which were added to dissolve the stirred polymer.

After complete solution, 89 g of (Trixene BI 7963) DEM blocked isocyanate were added. Trixene BI 7963 blocked isocyanate is available from Baxenden Chemicals, Limited and is a hexamethylene biuret DEM blocked with a NCO content of 8.8% and a NCO equivalent weight of 477 dissolved at 70 wt. % in a mixture of propylene glycol methyl ester and diethyl malonate.

To that mixture, 2475 g of preformed SNS-100P antimony-doped tin oxide nanoparticle dispersion in MEK (30% solid) were added with stirring. The SNS-100P tin oxide dispersion was obtained from Ishihara Sangyo Kaisha, Ltd., Osaka, Japan. Finally 4 g of Kcat, a chelated bismuth catalyst from King Industries, Inc., Norwalk, Conn., were introduced.

The coating dispersion was adjusted to 32% total solid concentration, of which 75 wt. % comprises tin oxide solids.

The coating dispersion was filtered through a 6 microns absolute Pall filter.

The dispersion was dip coated over 5 mil nickel substrates at withdrawal speeds of 1.0, 1.5, 2.5 and 3.5 millimeters per second (mm/s). The coverage was measured to 0.80, 0.89, 0.96, and 1.25 g/ft$^2$ respectively They were dried in a Blue M oven at 140° C. for one hour. The final coating was deep gray but was transparent.

The cured samples were evaluated by microscopy and Scanning Electron Micrograph, scanning electron microscope (SEM). The surfaces were very smooth.

Example 2

Trixene Bi Dp 98/1456 Blocked Isocyanate

In a four-liter wide mouth jar, 278 g of VAGF from The Dow Chemical Company, Midland, Mich., containing 81% vinyl chloride and 4% vinyl acetate, with a hydroxyl value of 59, and a calculated hydroxyl equivalent weight of 951, and 114 g of (Trixene BI DP 98/1456) DEM blocked isocyanate were added. Trixene BI DP 98/1456 blocked isocyanate is available from Baxenden Chemicals, Limited and is a isophorone diisocyanate trimer DEM blocked with a NCO content of 7.2% and a NCO equivalent weight of 585 dissolved at 65 wt. % in a mixture of butyl acetate and diethyl malonate.

To that mixture, 3713 g of preformed SNS-100P antimony-doped tin oxide nanoparticle dispersion in MEK (30% solid) were added with stirring. The SNS-100P tin oxide dispersion was obtained from Ishihara Sangyo Kaisha, Ltd., Osaka, Japan. Finally 1 g of Kcat, a chelated bismuth catalyst from King Industries, Inc., Norwalk, Conn., were introduced.

The coating dispersion was adjusted to 32% total solid concentration, of which 75% comprises of solid tin oxide.

The coating dispersion was filtered through a 6 microns absolute Pall filter. The dispersion was dip coated over 5 mil nickel substrates (180 mm diameter) at withdrawal speeds of 1.0, 2.0, 3.0 and 4.0 mm/s. The coverage was measured to 1.18, 1.79, 2.24, and 2.16 g/ft$^2$ respectively They were dried in a Blue M oven at 140° C. for two hours. The final coating was deep gray but was transparent.

The cured samples were evaluated by microscopy and Scanning Electron Micrograph, scanning electron microscope (SEM). The surfaces were very smooth.

Comparative Example 1

In a four-liter wide-mouth glass jar 46.8 g of a poly vinyl butyral-co-vinyl alcohol-co-vinyl acetate polymer (MW 170,000-250,000; 80 wt. % hydroxyl; 0-2.wt. % acetate; Tg 72-76 C; OH equivalent wt, 90.70) from Sigma-Aldrich, Inc., St. Louis, Mo., and 17.6 g of pentaerythritol ethoxylate (3/4 EO/OH; OH equivalent wt, 67.5) from Sigma-Aldrich, Inc. were dissolved in 755 g of methanol and 180 g of n-propanol. After complete solution, 301.3 g of the (Trixene BI 7962) Diethyl malonate blocked isocyanate were added. Then 2360 g of the preformed tin oxide dispersion (30 wt. %) from Ishihara Sangyo Kaisha, Ltd. were added with stirring. Dibutyltin dilaurate, 0.9 g was added. The mixture as filtered with a six-micron absolute Pall filter.

The mixture was dipped coated and dried at 140° C. for one hour. Evaluation by photomicrography, SEM and profilametry reveal a surface with a sign of phase separation. It was concluded that this composition was not a compatible composition to provide a surface-smoothing layer.

Effect of Tin Oxide Concentration

A mixture like Example 1 was made and designated as Mix 1. The concentration of SnO based on total solids was 75 percent. Another mixture designated as Mix 2 was made using 188.1 g of the poly vinyl chloride co-vinyl acetate co-hydroxy propyl acrylate; 88.5 g of DEM blocked isocyanate, Baxenden Trixene BI 7963, and 2370 g of MEK.

Mix 1 was dip coated as is at 4.5 mm/s to yield a coated layer containing 75 wt. % tin oxide (Example 3).

Then 2100 g of Mix 1 was added to 1047.6 g of Mix 2 and coated at 4.5 mm/s to yield a coated layer containing 65 wt. % tin oxide (Example 4).

Then 2050 g of the mixture of example 4 were added to 959 g of Mix 2 and coated at 4.5 mm/s to yield a coated layer containing 55 wt. % of tin oxide (Example 5).

Then 2420 g of the mixture of example 5 were added to 538 g of Mix 2 and coated at 4.5 mm/s to yield a coated layer containing 45 wt. % tin oxide (Example 6).

The coated samples were evaluated by SEM for surface smoothness and also characterized for electrical conductivity. The results are shown in Table 1 below:

TABLE 1

| Example | Wt. % SnO | Vol. % SnO | Resistivity Ohm-cm |
|---|---|---|---|
| 6 | 45 | 13 | 8.54E+09 |
| 5 | 55 | 18.6 | 9.99E+08 |
| 4 | 65 | 25.9 | 3.30E+08 |
| 3 | 75 | 36.5 | 1.16E+06 |

Electrophotographic Performance

Comparative Example 2

A 180 mm nickel sleeve was dip coated into a barrier layer solution made of Amilan CM8000 polyamide from Toray Industries of Japan (3.5% solid) dissolved in a 90:10 mixture of 1,1,2-trichloroethane:methanol at a withdrawal speed of 5.0 mm/s to yield a coverage of about 0.5 micron. After drying at 110° C., the sleeve was over coated with a charge generation dispersion (2.4% solid) in 100% 1,1,2-trichlorethane at a withdrawal speed of 0.80 mm/s, followed by drying at 110° C. for 30 minutes. Finally the sleeve was dipped in a charge transport layer solution (250 cycles per second)(cps) in dichloromethane at a withdrawal speed of 2.6 mm/s; followed by drying at 110° C. for 30 minutes.

The coated sleeve was mounted on a PDT-1000 drum sensitometer, manufactured by the Quality Electronics Associates of Burlington, Mass. The sleeve was charged to 500 volts, and exposed to 4.6 ergs/cm at 740 nm. The discharged voltage is shown in Table 2.

Examples 3, 4, 5, 6

The formulations of examples 3, 4, 5 & 6 were coated respectively in the same conditions as comparative example 2. They were also subjected to the same testing protocol. The discharged voltages are shown in Table 2.

TABLE 2

| Examples | Wt. % SnO | Vol. % SnO | Discharged Voltage |
|---|---|---|---|
| Comparative Example 2 | None | None | 36.6 |
| Example 6 | 45 | 13 | 6.7 |
| Example 5 | 55 | 18.6 | 10.8 |
| Example 4 | 65 | 25.9 | 10.6 |
| Example 3 | 75 | 36.5 | 13.5 |

The data above demonstrate the insensitivity of the discharged voltage to the concentration of tin oxide. Also it can be seen that the presence of the tin oxide surface smoothing layer leads to lower Toe.

Effect of Composition on Adhesion

Example 7

Incorporation Of Pentaerhitrytol Ethoxylate

In a four-liter wide mouth jar, 214 g of vinyl polyol (VAGF) from The Dow Chemical Company, Midland, Mich., containing 81% vinyl chloride and 4% vinyl acetate, with a hydroxyl value of 59, and a calculated hydroxyl equivalent weight of 951 were mixed with 3053 g of preformed SNS 100P tin oxide nanoparticle dispersion in MEK (30% solid) were added with stirring. The SNS-100P tin oxide dispersion was obtained from Ishihara Sangyo Kaisha, Ltd., Osaka, Japan.

Then 204.3 g of (Trixene BI 7963) DEM blocked isocyanate, and 15.20 g of three-fourths pentaerhytritol ethoxylate were added. Finally 2.5 g of tin di-t-butyl laurate were added.

The coating dispersion was adjusted to 36.9% total solid concentration, of which 71 wt. % comprises tin oxide solids.

The coating dispersion was filtered through a 6 microns absolute Pall filter.

The coating was dip coated over 5 mil. nickel substrates at withdrawal speed of 1.5, 2.5, and 3.5 millimeters per second (mm/s). The coverage was measured at 0.787, 1.103 and 1.261 g/ft$^2$ respectively.

They were dried in a Blue M oven at 140° C. for one hour. The final coating was deep gray but was transparent.

The cured samples were evaluated by microscopy and Scanning Electron Micrography (SEM). The surfaces were very smooth.

Example 8

One sleeve was coated with the composition of Example 7 at 3.5 mm/s, and cured at 90° C. for one hour (below the deblocking temperature of the isocyanate) to prevent any cross-linking. The cured sleeve was then dip coated into a barrier layer solution made of Amilan CM8000 polyamide from Toray Industries of Japan (3.5% solid) dissolved in a 90:10 mixture of 1,1,2-trichloroethane:methanol at a withdrawal speed of 5.0 mm/s to yield a coverage of about 0.5 micron. After drying at 140° C., the sleeve was over coated with a charge generation dispersion (2.4% solid) in 100% 1,1,2-trichlorethane at a withdrawal speed of 0.80 mm/s, followed by drying at 110° C. for 30 minutes. Finally the sleeve was dipped in a charge transport layer solution (250 cps) in dichloromethane at a withdrawal speed of 2.6 mm/s; followed by drying at 110° C. for 30 minutes.

The adhesion of the electrophotographic layer was tested, using a scotch tape test. The results are shown in Table 3.

Example 9

Another sleeve was coated with the composition of Example 7 at 3.0 mm/s and cured at 140° C. for one hour. The cured sleeve was then dip coated into a barrier layer solution made of Amilan CM8000 (3.5% solid) dissolved in a 90:10 mixture of 1,1,2-trichloroethane:methanol at a withdrawal speed of 5.0 mm/s to yield a coverage of about 0.5 micron. After drying at 110° C., the sleeve was over coated with a charge generation dispersion (2.4% solid) in 100% 1,1,2-trichlorethane at a withdrawal speed of 0.80 mm/s, followed by drying at 110° C. for 30 minutes. Finally the sleeve was dipped in a charge transport layer solution (250 cps) in dichloromethane at a withdrawal speed of 2.6 mm/s; followed by drying at 110° C. for 30 minutes.

The adhesion of the electrophotographic layer was tested, using a scotch tape test. The results are shown in Table 3.

Example 10

One sleeve was coated with the composition of Example 1 at 3.5 mm/s and cured at 140° C. for one hour. The cured sleeve was then dip coated into a barrier layer solution made of Amilan CM8000 polyamide (3.5% solid) dissolved in a 90:10 mixture of 1,1,2-trichloroethane:methanol at a withdrawal speed of 5.0 mm/s to yield a coverage of about 0.5 micron. After drying at 110° C., the sleeve was over coated with a charge generation dispersion (2.4% solid) in 100%

1,1,2-trichlorethane at a withdrawal speed of 0.80 mm/s, followed by drying at 110° C. for 30 minutes. Finally the sleeve was dipped in a charge transport layer solution (250 cps) in dichloromethane at a withdrawal speed of 2.6 mm/s; followed by drying at 110° C. for 30 minutes.

The adhesion of the electrophotographic layer was tested, using a scotch tape test. The results are shown in Table 3.

Example 11

One sleeve was coated with the composition of Example 1 at 3.5 mm/s and cured at 70° C. for one hour (below the deblocking temperature of the isocyanate) to prevent any cross-linking. The cured sleeve was then dip coated into a barrier layer solution made of Amilan CM8000 (3.5% solid) dissolved in a 90:10 mixture of 1,1,2-trichloroethane:methanol at a withdrawal speed of 5.0 mm/s to yield a coverage of about 0.5 micron. After drying at 140° C., the sleeve was over coated with a charge generation dispersion (2.4% solid) in 100% 1,1,2-trichlorethane at a withdrawal speed of 0.80 mm/s, followed by drying at 110° C. for 30 minutes. Finally the sleeve was dipped in a charge transport layer solution (250 cps) in dichloromethane at a withdrawal speed of 2.6 mm/s; followed by drying at 110° C. for 30 minutes.

The adhesion of the electrophotographic layer was tested, using a scotch tape test. The results are shown in Table 3.

TABLE 3

| Example | Smoothing Layer Curing | Amilan Curing | Adhesion |
| --- | --- | --- | --- |
| Example 8 | 90 | 140 | Good adhesion |
| Example 9 | 140 | 110 | Good adhesion |
| Example 10 | 140 | 110 | The photoconductor delaminates from the smoothing layer very easily |
| Example 11 | 90 | 140 | The photoconductor delaminates from the smoothing layer very easily |

The foregoing examples clearly show that desirable coatings are produced by the method of the present invention.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed:

1. A method for coating an electrophotographic process element adapted to receive an image from a light source with the light image then being converted to an electric charge image with a conductive polyurethane undercoat layer; the method comprising:
   a) producing a coating solution comprising a dialkyl malonate capped isocyanate or polyisocyanate, a polyol, a monofunctional alcohol and at least one finely divided metal oxide or mixtures thereof;
   b) coating the substrate with the coating solution to produce a coated substrate; and,
   c) heating the coated substrate at a temperature up to about 140° C. wherein the at least one metal oxide is present in an amount equal to from about 40 to about 90 weight percent of solids in the polyurethane layer.

2. The method of claim 1 wherein the element comprises a seamless metallic sleeve.

3. The method of claim 1 wherein the element comprises a seamless nickel sleeve.

4. The method of claim 1 wherein the element comprises a seamless plastic sleeve.

5. The method of claim 1 wherein the element comprises a photoelectric film.

6. The method of claim 1 wherein the dialkyl malonate is diethyl malonate.

7. The method of claim 1 wherein the dialkyl malonate contain the alkyl groups containing from 1 to about 12 carbon atoms.

8. The method of claim 7 wherein the alkyl groups contain from 2 to about 6 carbon atoms.

9. The method of claim 7 wherein the alkyl groups of the dialkyl malonate are the same.

10. The method of claim 7 wherein the alkyl groups of the dialkyl malonate are different.

11. The method of claim 1 wherein the isocyanate moiety is hexamethylene diisocyanate biuret.

12. The method of claim 1 wherein the isocyanate moiety is isophorone triisocyanate.

13. The method of claim 1 wherein a mixture of DEM-blocked isophorone triisocyanate and DEM-blocked hexamethylene diisocyanate buret is used.

14. The method of claim 1 wherein the isocyanate and polyol are present in amounts sufficient to provide an OH group to NCO group ratio of from about 1:1 to about 1:5.

15. The method of claim 14 wherein the ratio is from about 1:1 to about 1:3.

16. The method of claim 1 where the polyol is a vinyl polymer made of 81 mole % vinyl chloride, 4-mole % vinyl acetate, 15-mole % hydroxy ethyl acrylate, and hydroxyl value of 59.

17. The method of claim 1 where the polyol is a mixture comprising a vinyl polymer made of 81 mole % vinyl chloride, 4 mole % vinyl acetate, 15 mole % hydroxy ethyl acrylate, and hydroxyl value of 59; and three-fourth pentaerythritol ethoxylated.

18. The method of claim 1 wherein the at least one finely divided metal oxide is selected from the group consisting of metal oxides of titanium, zirconium, indium, antimony, tin, aluminum and mixtures thereof.

19. The method of claim 1 wherein the amount is from about 60 to 80 weight percent.

20. The method of claim 1 wherein the finely divided metal oxide comprises particles of a size less than about 0.1 micron.

21. The method of claim 20 wherein the size is from about 10 to about 50 nanometers.

22. The method of claim 1 wherein the polyurethane layer has a thickness of at least 2 microns.

23. The method of claim 22 wherein the thickness is greater than about 10 microns.

24. The method of claim 1 wherein the mono-functional alcohol is present in an amount from about 10 to about 25-weight percent monofunctional alcohol based upon the weight of the coating solution.

* * * * *